United States Patent [19]

Onuma et al.

[11] Patent Number: 5,105,686
[45] Date of Patent: Apr. 21, 1992

[54] TRANSMISSION CASE

[75] Inventors: Isamu Onuma, Zama; Kazuhiko Sugano, Yokohama, both of Japan

[73] Assignee: Nissan Motor Co., Ltd., Yokohama, Japan

[21] Appl. No.: 692,954

[22] Filed: Apr. 25, 1991

Related U.S. Application Data

[63] Continuation of Ser. No. 423,111, Oct. 19, 1989, abandoned.

[30] Foreign Application Priority Data

Oct. 25, 1988 [JP] Japan ................... 63-267302

[51] Int. Cl.$^5$ ............................................. F16H 57/00
[52] U.S. Cl. ........................................................ 74/606 R
[58] Field of Search .................... 74/606 R; 192/70.2, 192/85 AA, 87.1

[56] References Cited

U.S. PATENT DOCUMENTS

| | | | |
|---|---|---|---|
| 4,261,227 | 4/1981 | Yamamori et al. | 74/606 R |
| 4,628,754 | 12/1986 | Ideta et al. | 74/606 R |
| 4,736,653 | 4/1988 | Hayakawa et al. | 74/606 R |
| 4,793,213 | 12/1988 | Nishimura | 74/606 R |
| 4,823,637 | 4/1989 | Taguchi et al. | 74/606 R |

*Primary Examiner*—Rodney H. Bonck
*Assistant Examiner*—Nicholas Whitelaw
*Attorney, Agent, or Firm*—Foley & Lardner

[57] ABSTRACT

A transmission case has a wall portion defining an oil pressure chamber of a fluid operated friction device, and an end portion having a threaded hole receiving a bolt for fastening a side cover to the case. In order to make the wall portion impervious to oil notwithstanding defects formed by casting, the wall portion is separated from the end portion by a U-shaped groove. Furthermore, the end portion is shaped into an outward flange through which the threaded hole passes from one side to the other.

20 Claims, 3 Drawing Sheets

TRANSMISSION CASE

This application is a continuation of application Ser. No. 07/423,111, filed Oct. 19, 1989, now abandoned.

BACKGROUND OF THE INVENTION

The present invention relates to transmissions of motor vehicles, and more specifically to transmission cases of automatic transaxles.

FIGS. 3 and 4 show a conventional automatic transaxle (4HP14Q type transaxle by ZF company). This transaxle includes a torque converter housing a, a transmission case b, a side cover c, a torque converter d, and a differential e. The transmission has one multiple disc clutch near the side cover c within the transmission case b. This clutch has a piston f and an oil chamber g for applying pressure on the piston f. A bolt h is one of fasteners which structurally connect the side cover c to the transmission case b. The transmission case b is formed with an internally threaded hole i for receiving the bolt h.

FIG. 4 shows a casting defect j, such as a shrinkage cavity, hole or crack, or a blowhole, which is formed in the transmission case b during the process of casting metal into the transmission case b. In this transmission case b, the oil chamber g is very close to the threaded hole i. Therefore, the defect j is easily made open in the surfaces by a subsequent machining process for forming the threaded hole i and the inside surface of the oil chamber g, and the oil chamber g is easily connected with the hole i by the defect j. As a result, the oil pressure leaks from the oil chamber g through the defect j, and the clutch becomes unable to function properly.

The threaded hole i of this example is a blind hole which is closed at one end, so that trimming is required in the process for forming the threaded hole i.

SUMMARY OF THE INVENTION

It is therefore an object of the present invention to provide a structure of a transmission which is not easily affected by casting defects.

According to the present invention, a structure of a transmission comprises a transmission case including a wall portion defining a fluid chamber, a flange portion which is formed with a threaded hole having first and second ends which are both open, and a hollow portion such as a groove formed between the a wall portion and the flange portion.

In this structure, the wall portion bounding the fluid chamber such as an oil pressure chamber of a friction element of the transmission is separated from the flange portion having the threaded hole by the hollow portion. Therefore, it is unlikely that the fluid chamber will be connected with the threaded hole by a casting defect. Furthermore, the threaded hole passes completely through the flange portion of the transmission case, so that the machining process a for forming the threaded hole becomes much easier.

DETAILED DESCRIPTION OF THE INVENTION

Figure 1:
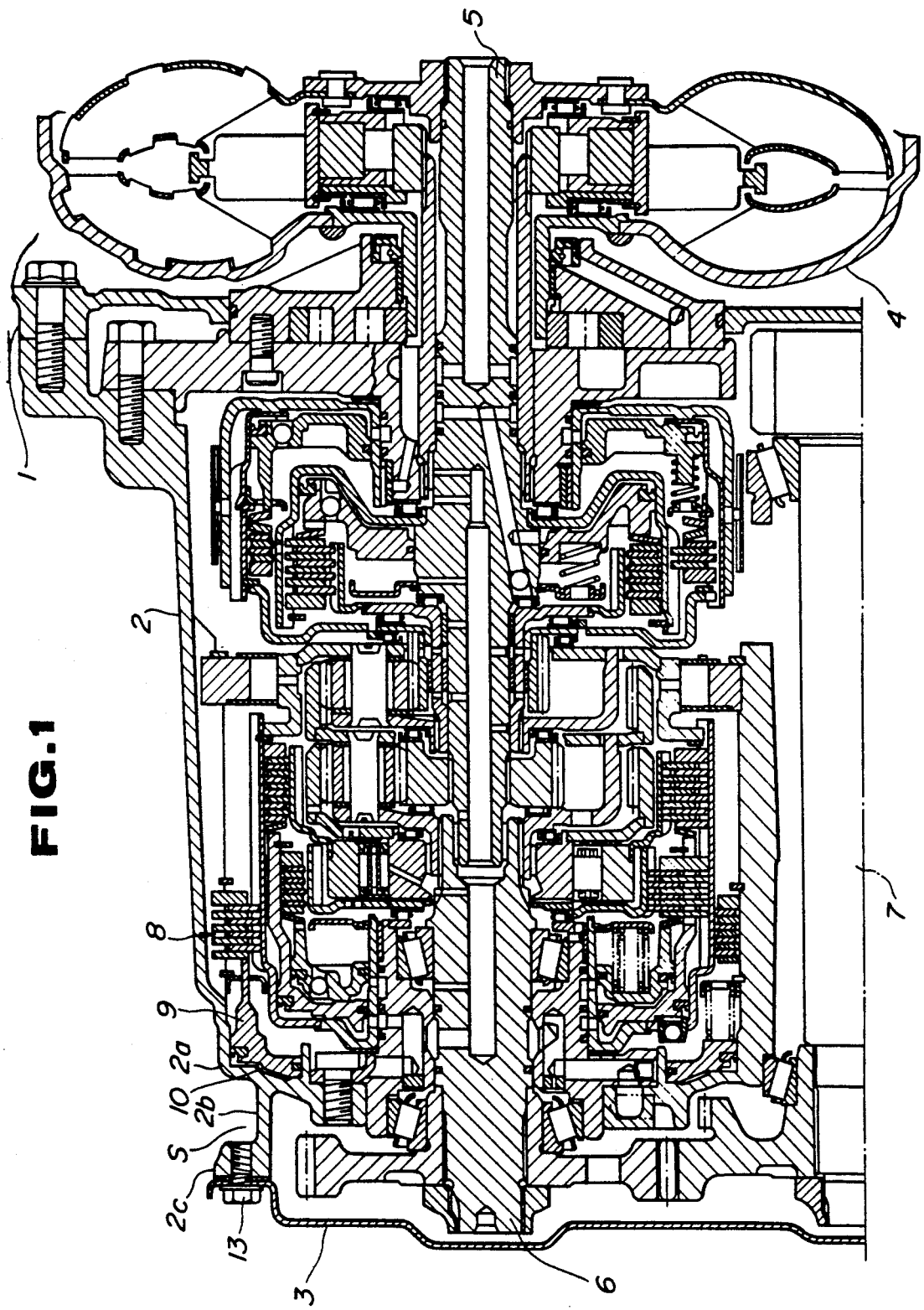
FIG. 1 is a partial sectional view of an automatic transaxle according to one embodiment of the present invention.
Figure 2:
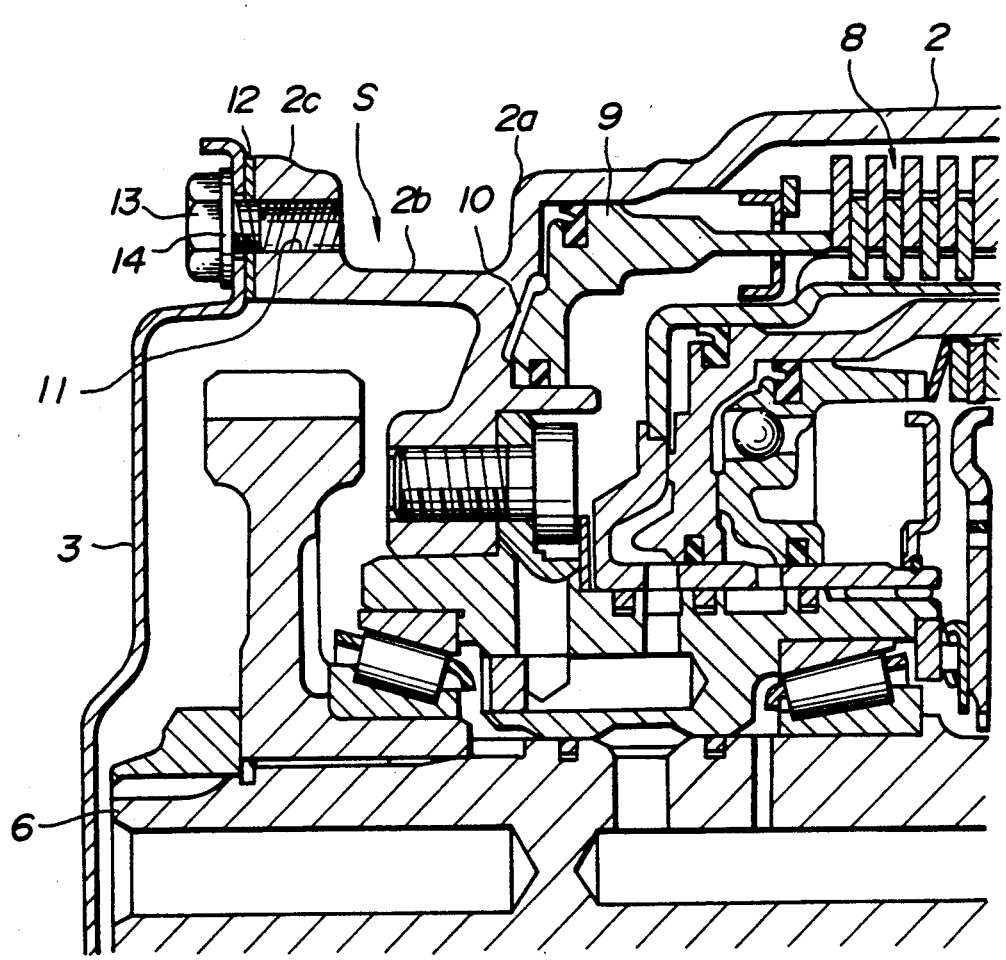
FIG. 2 is an enlarged section view of a portion of the transaxle shown in FIG. 1.
Figure 3:
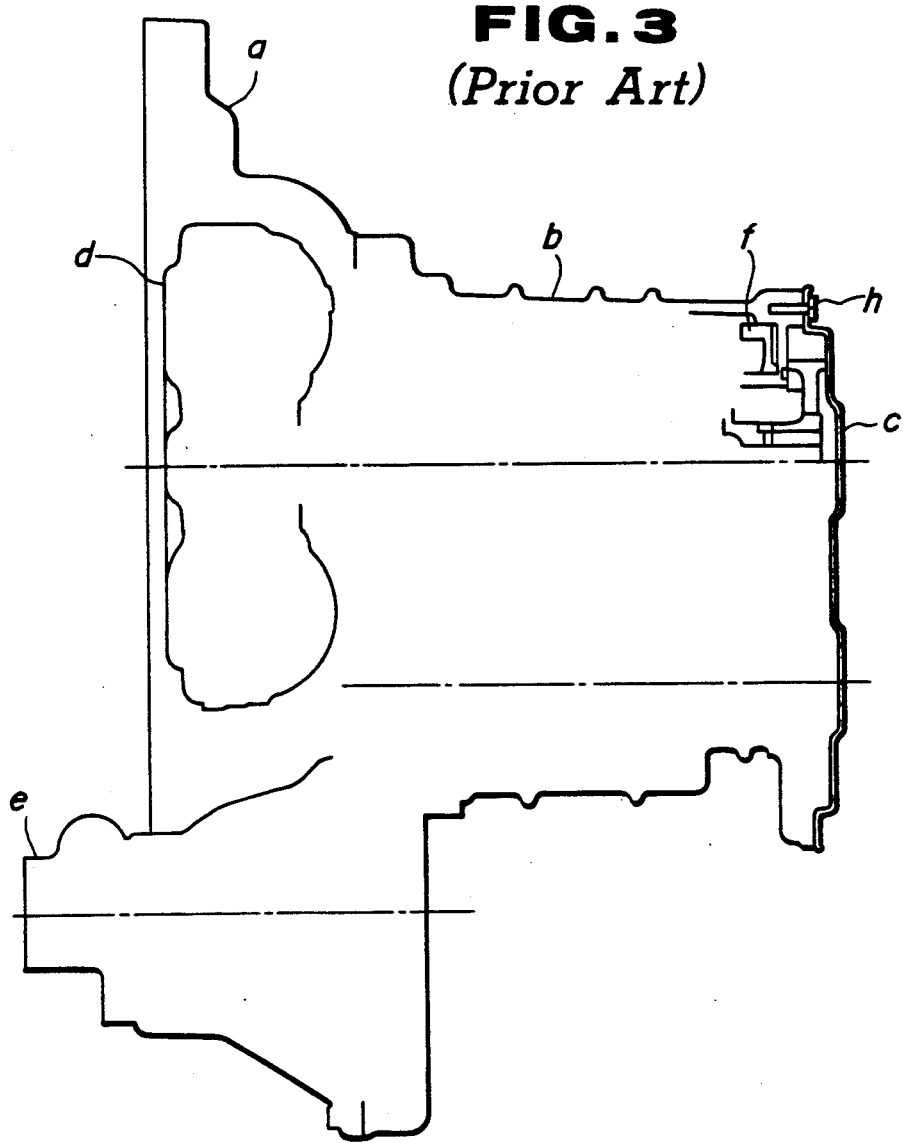
FIG. 3 a schematic sectional view of a convention automatic transaxle.
Figure 4:
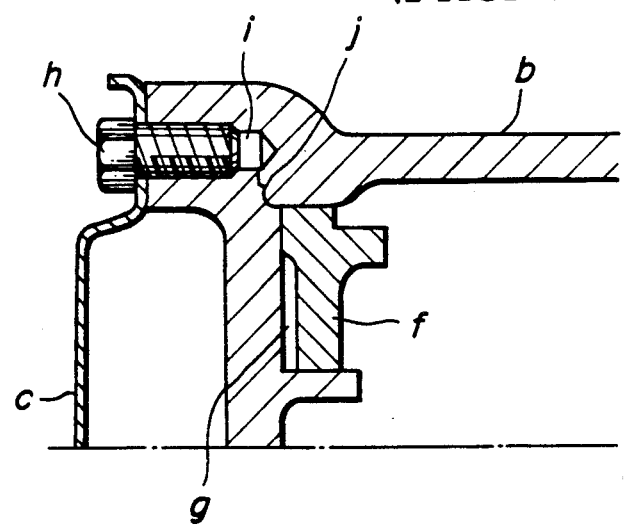
FIG. 4 is a sectional view of a portion of the conventional transaxle shown in FIG. 3.

FIGS. 1 and 2 show one embodiment of the present invention. A transmission of this embodiment is incorporated in an automatic transaxle.

The automatic transaxle shown in FIG. 1 includes a torque converter housing 1, a transmission case 2, a side cover 3, a torque converter 4, a transmission input shaft 5, transmission output shaft 6, a counter shaft 7, and a friction device 8 operated by a fluid pressure. In this embodiment, the friction device 8 is a multiple disc clutch, and is used as a holding device or brake. The multiple disc brake 8 has a piston 9 and an oil chamber 10 for the piston 9. Similar transaxles are shown in a U.S. Pat. No. 4,823,637 (especially in FIG. 1), and many other documents. The explanation relating to FIG. 1, of the above-mentioned U.S. Patent is herein incorporated by reference. In the transaxle of this embodiment, the transmission gear train is disposed between the torque converter 4 and the side cover 3.

As shown in FIG. 2, the transmission case 2 of this embodiment has a side wall portion 2a, a bottom wall portion 2b and an outward flange portion 2c. A U-shaped groove S is formed by the portions 2a, 2b and 2c. The bottom portion 2b forms the bottom of the groove S, and the side wall portion 2a and the outward flange portion 2c form side walls of the groove S. The wall thickness of the side wall portion 2a is approximately uniform. The side wall portion 2a defines the oil chamber 10 of the multiple disc brake 8. The oil chamber 10 is formed between the side wall portion 2a of the transmission case 2 and the clutch piston 9. The bottom portion 2a extends from the side wall portion 2a toward the side cover 3 substantially along the axis of the gear train and the torque converter. The groove S is formed by casting, and the portions 2a, 2b and 2c are integral parts of a casting. A casting surface in the groove S is left in the final product.

The flange portion 2c of the transmission case 2 is formed with at least one internally threaded hole 11. The threaded hole 11 passes completely through the flange portion 2c from one side to the other, and both ends of the hole 11 are open. One end of the hole 11 opens in the groove S. The side cover 3 is fastened to the transmission case 2 by at least one bolt 13 which is tightened into the threaded hole 11. A packing 12 is interposed between the flange portion 2c and the side cover 3. A washer 14 is interposed between a head of the bolt 13 and the side cover 3.

In the transmission case of this embodiment, the groove S is formed between the wall 2a bounding the oil pressure chamber 10 of the multiple disc brake 8, and the portion 2c having the threaded hole 11 for receiving the bolt 13 for fastening the side cover 3, so as to separate the oil chamber 10 and the threaded hole 11. Therefore, the oil chamber 10 is isolated from the hole 11 even if a hollow defect, such as a cavity or a blow hole, formed in the casting is exposed by machining of the threaded hole 11 and the interior surfaces of the oil chamber 10. The transmission case 2 of this embodiment is immune against oil pressure leakage of the oil chamber 10.

The threaded hole 11 of this embodiment is not blind, but it is open at both ends. Therefore, the design of the transmission case of this embodiment makes it easier to form an internal screw thread in the hole 11, and eliminates the necessity of trimming or deburring.

What is claimed is:

1. A structure of a transmission, comprising;
   a transmission case enclosing a transmission gear train arranged around an axis, said transmission case comprising a wall portion defining a fluid chamber, a flange portion which is formed with a threaded hole having first and second ends which are both open, and a groove formed between said wall portion and said flange portion, said wall portion having an inside surface which is finished by machining, and which forms an interior surface of an oil pressure chamber of a fluid-operated friction device of the transmission, said groove being formed in an outside surface of the transmission case and the flange portion being in the form of an outward flange;
   said transmission case further comprising a bottom portion forming a bottom of said groove, said wall portion and said flange portion extending from said bottom portion so that side walls of said groove are formed by said wall portion and said flange portion, said wall portion, said flange portion and said bottom portion of said transmission case all being integral parts of a single casting and a wall surface within said groove being in ascast condition;
   said threaded hole extending from said first end to said second end substantially in parallel to the axis of said gear train with one end of the threaded hole being open in said groove; and
   wherein said bottom portion extends axially from said wall portion to said flange portion, and separates said wall portion and said flange portion from each other along said axis of said gear train.

2. A structure according to claim 1, further comprising a torque converter.

3. A structure according to claim 2 wherein said gear train is disposed between said torque converter and said side cover.

4. A structure of a transmission, comprising;
   a transmission case enclosing a transmission gear train arranged around an axis, said transmission case comprising a wall portion defining a fluid chamber, a flange portion which is formed with a threaded hole having first and second ends which are both open, and a groove formed between said wall portion and said flange portion, said wall portion having an inside surface which is finished by machining, and which forms an interior surface of an oil pressure chamber of a fluid-operated friction device of the transmission, said groove being formed in an outside surface of the transmission case and the flange portion being in the form of an outward flange;
   said transmission case further comprising a bottom portion forming a bottom of said groove, said wall portion and said flange portion extending from said bottom portion so that side walls of said groove are formed by said wall portion and said flange portion, said wall portion, said flange portion and said bottom portion of said transmission case all being integral parts of a single casting and a wall surface within said groove being in ascast condition;
   said threaded hole extending from said first end to said second end substantially in parallel to the axis of said gear train with one end of the threaded hole being open in said groove; and
   wherein said side cover closes an opening of said transmission case, and comprises a solid wall which intersects said axis of said gear train.

5. A structure according to claim 4 wherein said gear train comprises an output shaft which is rotatable about said axis of said gear train and which terminates at a first end, and said structure further comprises a counter shaft which extends in parallel to said axis of said gear train and which terminates at a first end, said first end of said output shaft of aid gear train being drivingly connected by gearing with said first end of said counter shaft, said side cover confronting both of said first ends of said output shaft and said counter shaft.

6. A structure according to claim 5 wherein said gear train and said counter shaft are confined in an enclosed interior space bounded by said side cover and said transmission case.

7. A structure of a transmission, comprising:
   a transmission case enclosing a transmission gear train arranged around an axis, said transmission case comprising a wall portion defining a fluid chamber, a flange portion which is formed with a threaded hole having first and second ends which are both open, and a bottom portion which extends axially from said wall portion to said flange portion substantially in parallel to said axis of said gear train, which separates said wall portion and said flange portion from each other along said axis of said gear train, and which forms a bottom of a groove formed between said wall portion and said flange portion, said wall portion and said flange portion extending radially outwardly from said bottom portion so that side walls of said groove are formed by said wall portion and said flange portion, said wall portion, said flange portion and said bottom portion of said transmission case all being integral parts of a single casting.

8. A structure according to claim 7 wherein said threaded hole extends from said first end to said second end substantially in parallel to said axis of said gear train, and one end of said threaded hole is open into said groove.

9. A structure according to claim 8 further comprising a side cover fastened to said transmission case by a bolt tightened into said threaded hole.

10. A structure of a transmission, comprising;
    a transmission case enclosing a transmission gear train arranged around an axis, said transmission case comprising a wall portion defining a fluid chamber, a flange portion which is formed with a threaded hole having first and second ends which are both open, and a groove formed between said wall portion and said flange portion, said transmission case further comprising a bottom portion forming a bottom of said groove, said wall portion and said flange portion extending from said bottom portion so that side walls of said groove are formed by said wall portion and said flange portion;
    said wall portion, said flange portion and said bottom portion of said transmission case all being integral parts of a single casting;
    said threaded hole extending from said first end to said second end substantially in parallel to said axis of said gear train, with one end of said threaded hole being open into said groove; and
    wherein said groove is a U-shaped groove having a U-shaped cross sectional profile, said bottom portion extending axially from said wall portion to said flange portion, and said wall portion and said flange portion extending radially outwardly from said bottom portion.

11. A structure according to claim 10 wherein said bottom portion extends axially from said wall portion to said flange portion, and separates said wall portion and said flange portion from each other along said axis of said gear train.

12. A structure according to claim 10 wherein said groove is formed in an outside surface of said transmission case, and said flange portion is in a form of an outward flange.

13. A structure according to claim 12 wherein said wall portion has an inside surface which is finished by machining, and which forms an interior surface of an oil pressure chamber of a fluid-operated friction device of the transmission.

14. A structure according to claim 13 wherein a wall surface within said groove is in an as-cast condition.

15. A structure according to claim 10, further comprising a side cover fastened to said transmission case by a bolt tightened into said threaded hole.

16. A structure according to claim 15 wherein said structure further comprises a torque converter which is coaxial with said gear train, said side cover and said torque converter are spaced from each other along said axis and confront each other, and said gear train is disposed axially between said side cover and said torque converter.

17. A structure according to claim 16 wherein said transmission gear train is a component part of an automatic transaxle.

18. A structure according to claim 10 further comprising a side cover for closing an opening of said transmission case, said side cover being fastened to said transmission case by a bolt tightened into said threaded hole, said side cover comprising a solid wall which intersects said axis of sad gear train.

19. A structure according to claim 18 wherein said gear train comprises an output shaft which is rotatable about said axis of said gear train and which terminates at a first end, and said structure further comprises a counter shaft which extends in parallel to said axis of said gear train and which terminates at a first end, said first end of said output shaft of said gear train being drivingly connected by gearing with said first end of said counter shaft, said side cover confronting both of said first ends of said output shaft and said counter shaft.

20. A structure according to claim 19 wherein said gear train and said counter shaft are confined in an enclosed interior space bounded by said side cover and said transmission case.

* * * * *